No. 791,519. PATENTED JUNE 6, 1905.
W. W. WALTER & E. H. CHAPMAN.
NUT LOCK.
APPLICATION FILED OCT. 31, 1904.

Witnesses
Harry L. Amer.
H. H. Masson

Inventors
William W. Walter
and Elmer H. Chapman
By Jay D. Miller
Attorney

No. 791,519. Patented June 6, 1905.

UNITED STATES PATENT OFFICE.

WILLIAM W. WALTER AND ELMER H. CHAPMAN, OF AURORA, ILLINOIS.

NUT-LOCK.

SPECIFICATION forming part of Letters Patent No. 791,519, dated June 6, 1905.

Application filed October 31, 1904. Serial No. 230,715.

*To all whom it may concern:*

Be it known that we, WILLIAM W. WALTER and ELMER H. CHAPMAN, citizens of the United States, residing at Aurora, in the county of Kane and State of Illinois, have invented certain new and useful Improvements in Nut-Locks, of which the following is a specification.

This invention relates to means to secure nuts upon bolts at various points, particularly for use in uniting together pieces of timber liable to shrink abnormally; and the objects of our invention are to produce a simple nut-lock capable of retaining a nut upon a bolt at points distant from each other equal to at least four times the thickness of the nut. We attain these objects by the construction illustrated in the accompanying drawings, in which—

Figure 1:
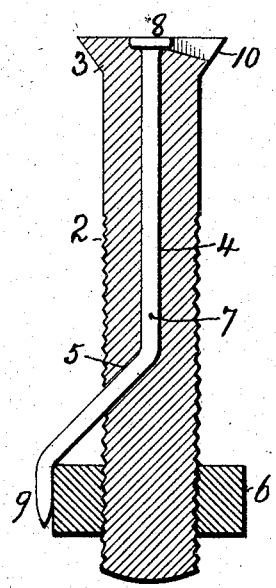
Figure 2:
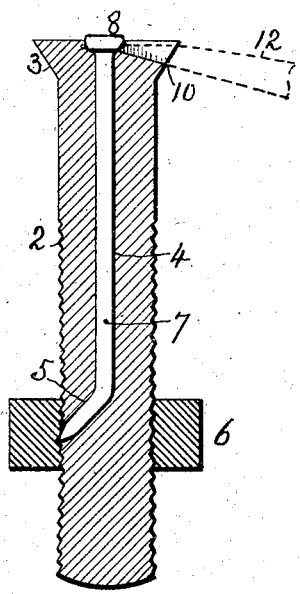
Figure 3:
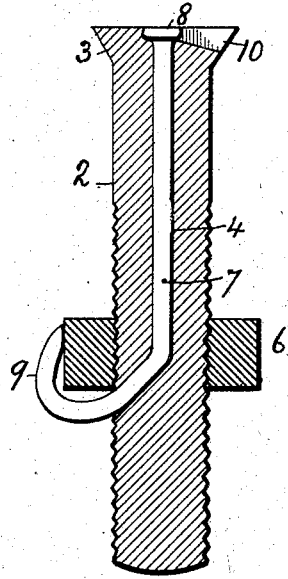
Figure 4:
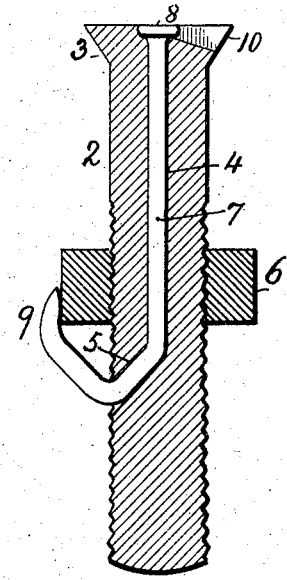

Figure 1 is a longitudinal section of a bolt and nut with the nut-retainer having its point bent down to secure the nut close to the point of the bolt. Fig. 2 is a similar section with the nut at a higher point upon the bolt and the nut-retainer in engagement with the thread of the nut. Fig. 3 is a similar section with the nut at a still higher point, the small end of the nut-retainer passing under the nut and bent up to engage with the side of the nut. Fig. 4 is a similar section with the nut at a still higher point and the nut-retainer bent higher up.

In said drawings the numeral 2 indicates a screw-bolt having a conical head 3, but said head may have any other well-known form. Centrally of said bolt and head there is a tubular perforation 4, which extends within a short distance of the point of the bolt and is met by another perforation 5 of substantially the same diameter, which is drilled about the middle of the length of the threaded portion and at an angle of forty-five degrees to the axis of the bolt. Upon the threaded portion of the bolt is placed the nut 6, which is preferably hexagonal and of suitable thickness. Within the perforation 5 of the bolt is placed a pointed wire 7, of soft iron, longer than said perforation and preferably provided with a head 8. Said pointed wire or nail 7, which is of slightly smaller diameter than the perforation 4, is driven therethrough and part way of the perforation 5, where it becomes retained by friction ready for use. When the bolt has been placed in position for use and the nut 6 has been located upon the bolt, the nail 7 is further driven for engagement with the nut. If the end of the perforation 5 is hidden by the nut, the nail 7 used is of comparatively short length, so that its pointed end when driven will impinge against and partly mutilate the thread of the nut and lock it in any desired position of the thickness of the nut. If the end of the perforation 5 is hidden within the wooden beam it is intended to bolt, the nail or wire 7 used is longer, as shown in Fig. 1, and is driven through a small portion of said beam, and after the nut has been set in proper position the pointed portion of the nail is forced down with a hammer against one of the sides of the nut, and then locks said nut. If the end of the perforation 5 appears under the nut, as in Figs. 3 and 4, a nail 7 is used of substantially the same length as that shown in Fig. 1, but after being driven in its pointed end 9 is bent upward with a hammer away from the end of the bolt and against one of the sides of the nut to lock the latter in any desired position. The head of the bolt has a radial groove 10 to permit the introduction of a pointed tool 12 to engage with the under side of the head 8, so that with a few blows of a hammer on the large end of said tool 12 the nail can be partly lifted and in position to be grasped with a nail-extracting tool. The same tool 12 can be used to partly straighten the pointed end of the bolt to permit the adjustment of the nut in a new position. Thus the nut can be locked upon the bolt whatever may be the shrinkage or decay of the timber upon which it is used.

Having now fully described our invention, we claim—

1. In a nut-lock the combination of a screw-threaded bolt having centrally thereof a perforation through its head and body to a point about half-way of its screw-threaded portion and leading to a perforation divergent at an angle of forty-five degrees to the axis of said bolt, with a nut upon said bolt, and a headed and pointed nail driven into said perforations, whereby the pointed end of said nail is adapted to engage with the inner face and side of the nut, also with its screw-tapped inner side and also with its outer face and side, substantially as shown and described.

2. In a nut-lock the combination of a screw-threaded bolt having axially thereof a perforation through its head and body to a point about half-way of its screw-threaded portion, another perforation diverged at an angle of forty-five degrees to the axis of said bolt, and upon said bolt a nut having its screw-tapped hole free of vertical grooves, and a headed and pointed nail driven into said perforations, whereby the pointed portion of the nail is adapted to engage with the polygonal faces of the nut, substantially as described.

In testimony whereof we affix our signatures in presence of two witnesses.

WILLIAM W. WALTER.
ELMER H. CHAPMAN.

Witnesses as to William W. Walter:
  GEO. W. KOERPER,
  H. P. STENGER.

Witnesses as to Elmer H. Chapman:
  JOHN S. MILLER,
  M. E. CHAPMAN.